(12) United States Patent
McCaffrey (10) Patent No.: US 9,280,568 B2
(45) Date of Patent: Mar. 8, 2016

(54) ZERO DOWNTIME SCHEMA EVOLUTION

(71) Applicant: Gerard McCaffrey, Canton, MA (US)

(72) Inventor: Gerard McCaffrey, Canton, MA (US)

(73) Assignee: SAP SE, Walldorf (DE)

( * ) Notice: Subject to any disclaimer, the term of this patent is extended or adjusted under 35 U.S.C. 154(b) by 459 days.

(21) Appl. No.: 13/682,295

(22) Filed: Nov. 20, 2012

(65) Prior Publication Data

US 2014/0143284 A1    May 22, 2014

(51) Int. Cl.
    *G06F 17/30*    (2006.01)
(52) U.S. Cl.
    CPC ................. *G06F 17/30297* (2013.01)
(58) Field of Classification Search
    CPC ............. G06F 17/30592; G06F 17/30595; G06F 17/30607
    USPC ................. 707/803, 806, 807, 808
    See application file for complete search history.

(56) References Cited

U.S. PATENT DOCUMENTS

| 6,535,868 | B1 * | 3/2003 | Galeazzi | G06F 17/30371 |
| 7,343,377 | B1 * | 3/2008 | van Opdorp | G06F 17/30371 |
| 7,599,947 | B1 * | 10/2009 | Tolbert | G06F 17/30917 |
| 8,676,863 | B1 * | 3/2014 | Connell | G06F 17/30917 707/804 |
| 2007/0061543 | A1 * | 3/2007 | Uppala | G06F 17/30587 711/173 |
| 2011/0107327 | A1 * | 5/2011 | Barkie | G06F 8/63 717/176 |
| 2011/0252005 | A1 * | 10/2011 | Lauer | G06F 17/30545 707/690 |
| 2012/0173481 | A1 * | 7/2012 | Poth | G06Q 10/10 707/608 |
| 2014/0114913 | A1 * | 4/2014 | Engelko | G06F 17/30 707/609 |

* cited by examiner

*Primary Examiner* — Hosain Alam
*Assistant Examiner* — Ahmed Abraham
(74) *Attorney, Agent, or Firm* — Kenyon & Kenyon LLP (57) ABSTRACT

A method for updating a database schema may include maintaining a database, database schema and a first version of an application. The method may include generating application schema for the first version of the application, the application schema including a mapping of one or more classes of the application to a respective table in the database. The method may include executing the first version of the application and storing an application data object in the database in accordance with the application schema. While the first version of the application is executing, the method may include receiving a request to update the first version of the application to a different version, identifying application metadata for the different version of the application, comparing the application metadata for the different version of the application with the database schema for the database, and updating the database schema based on the comparison.

17 Claims, 5 Drawing Sheets

ZERO DOWNTIME SCHEMA EVOLUTION

BACKGROUND

Database systems employ database schema to organize data in a database. The database schema can include a structure of the database system described in a language supported by a database management system (DBMS). Stated in another way, the database schema describes the organization of the data in the database. The DBMS includes programs to control the creation, organization, maintenance, storage and use of data in the database. A relational DBMS can be used in relational databases that store data and relationships among the data in tables.

Some applications developed using an object oriented methodology and language store data objects in relational databases. An application may maintain metadata that stores a mapping of the application's data objects to the databases. The mapping enables an application to use a relational database as a persistent object store. For an application, the metadata may describe each persistent class and each persistent member of the class. The application metadata may be used to generate the database schema.

When an application is updated, its corresponding data base schema also needs to be updated or evolved to support the updated application. When the application is updated, there may be a need to perform schema evolution to update the set of classes or set of members of one or more classes in the database. For example, schema evolution may modify the class descriptions in the schema of the database to be consistent with definitions in the program. Schema evolution may provide a new database schema due to the changes required by the new application. Object conversion can be performed to make data consistent with the new schema.

Traditionally, the schema stored in the DBMS is evolved to the new schema using a schema update application that performs the necessary schema evolution at the time the new application is installed. For example, the schema stored in the DBMS can be evolved to the new schema by the application of a structured query language (SQL) script which would alter the application's database schema in a batch process to conform to the requirements of the new application. However, with such schema evolution the application is unavailable during the time required to install and activate the new software release. Furthermore, the application is unavailable during the time it is required to execute the schema update application (e.g., SQL script) to bring the schema stored in the DBMS into conformity with the requirements of the new application.

BRIEF DESCRIPTION OF THE DRAWINGS

The accompanying drawings illustrate the present disclosure and, together with the description, further serve to explain the principles of the disclosure and to enable one skilled in the pertinent art to make and use the disclosure.

DETAILED DESCRIPTION

Embodiments of the present disclosure provide methods to update a database schema. In one embodiment, the method for updating a database schema may include maintaining a database, database schema and a first version of an application. The method may include generating application schema for the first version of the application, the application schema including a mapping of one or more classes of the application to a respective table in the database. The method may include executing the first version of the application and storing an application data object in the database in accordance with the application schema. While the first version of the application is executing, the method may include receiving a request to update the first version of the application to a different version, identifying application metadata for the different version of the application, comparing the application metadata for the different version of the application with the database schema for the database, and updating the database schema based on the comparison.

The various embodiments provide for a method to update the database or the database schema while reducing the amount of time needed to update the software. The various embodiments may reduce or eliminate the amount of time needed for schema evolution during the update of the software. The methods may reduce or eliminate the application downtime during the schema evolution.

Figure 1:
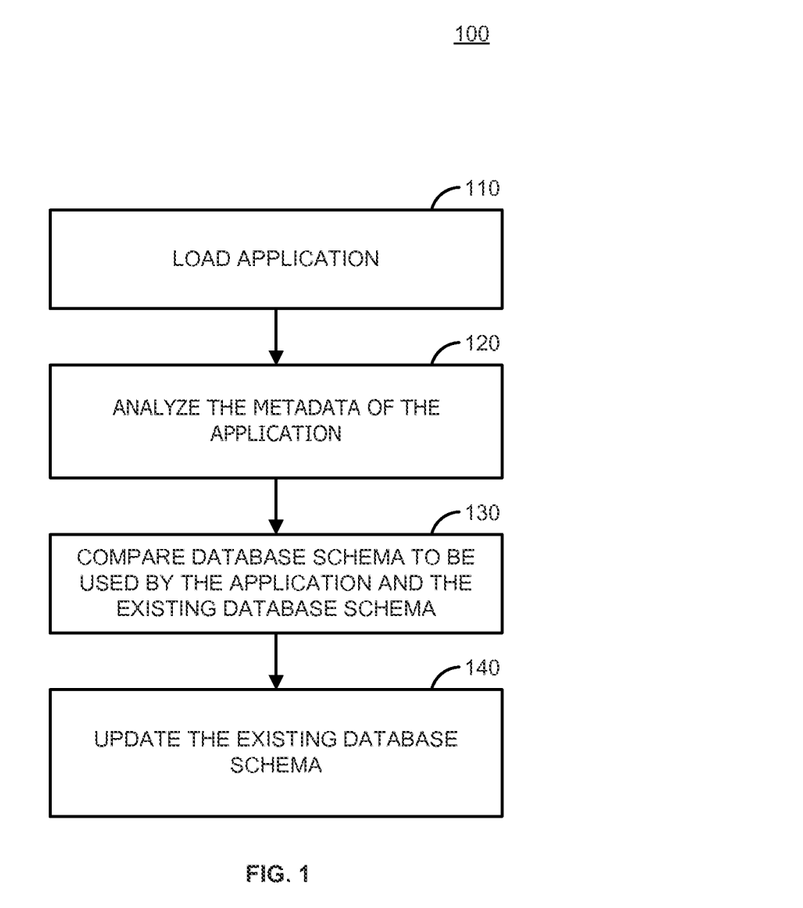
FIG. 1 shows a first embodiment of a process of updating a database schema.

FIG. 1 shows a first embodiment of a process 100 of updating a database schema. The process may be executed by a processing device. The process described in FIG. 1 may include loading an application 110, analyzing the metadata of the application 120, comparing the database schema of the application to the existing database schema 130, and updating the existing database schema 140.

Loading the application 110 may include installing the application, updating the application, executing an operation of the application or loading the metadata of the application, but is not so limited. Loading the application may include an operation that accesses or generates the application metadata. The application may include application developed using object oriented methodology. Applications (e.g., enterprise software) developed using object oriented methodology and language can use application metadata driven Object Relational Mapping (ORM) layer to accomplish mapping of the hierarchical in-memory view of a business object onto the flattened relational view of the same object. The ORM may enable use of a relational database as an object store.

The metadata of the application may be analyzed 120 to determine what tables, classes, or members the application will access or request from the database. The analysis may include determining what type of database schema may be compatible with the application. The analysis may include determining what tables, classes or class members may be utilized by the application. The ORM layer may maintain application metadata which describes the classes that can be utilized by the application. Because the application metadata may describe each class and each member of the class, the analysis of the application metadata may provide the details of the update needed for the existing database schema. Thus, the application metadata describing each class and member of the class may be used to determine the database schema that is compatible with the application.

The information from the application metadata may be used to perform a comparison between the database schema that would be compatible with the application and the existing database schema 130. Based on the comparison a new database schema can be generated or the existing database schema can be updated 140. Because the application metadata describes each class and each member of the class that can be utilized by the application, there is sufficient information to generate a database schema that is compatible or that can be utilized with the application. In one embodiment, the information in the application metadata can be used to generate, for example, a column definition in the SQL dialect that is supported by the target DBMS.

Thus, at the time of an upgrade or when a new application is accessed, the changes to the database schema that are needed by the new application can be determined by analyzing the metadata of the application. By analyzing the metadata of the application, updates can be performed to the database schema such that the database schema is compatible with the new application.

The process eliminates the need to keep the application offline and unavailable in order to manually run the SQL script to alter the database schema. Rather than requiring the application of the SQL script performing batch process to bring the database schema into conformance, the updating of the schema can be driven by analyzing the application metadata or by normal application database access. Thus, the database schema can be updated to compensate for the changes which occur from the application release to application release.

Figure 2:
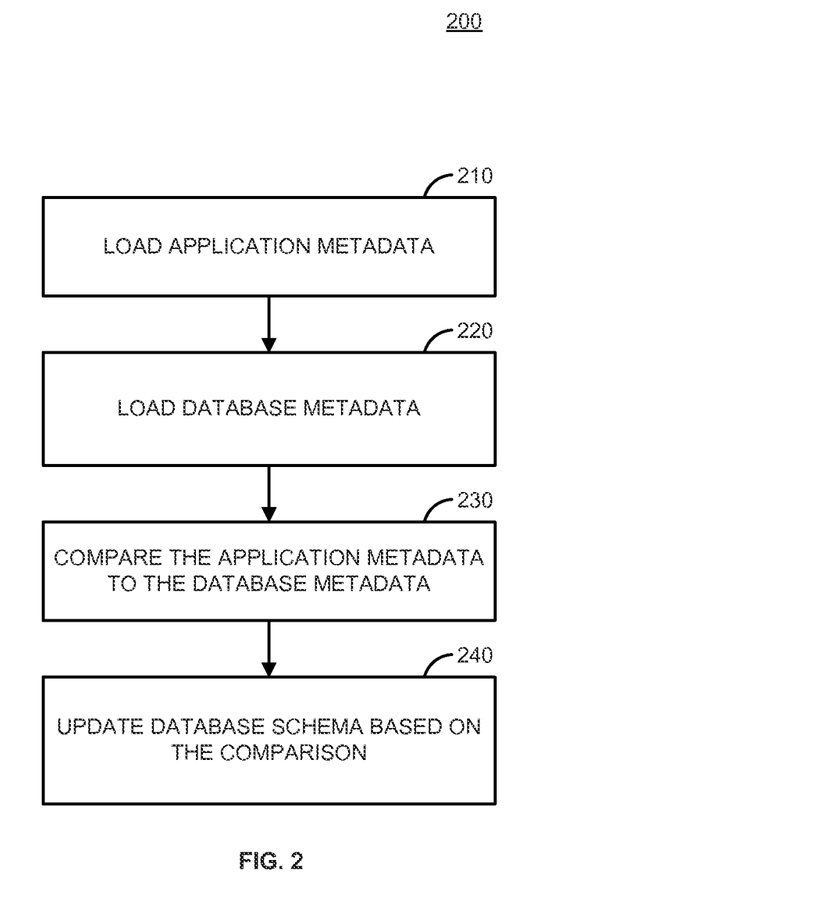
FIG. 2 shows a second embodiment of a process of updating a database schema.

FIG. 2 shows a second embodiment of a process 200 of updating a database schema. The process may be executed by a processing device. The process may include loading the application metadata 210, loading the database metadata 220, comparing the application metadata to the database metadata 230, and updating the database schema based on the comparison 240.

The application metadata can be loaded 210 to provide information on a database schema that may be compatible with the application. As discussed above, the application metadata can be used to provide the class or member of the class that can be utilized by the application. Similarly, the database metadata can be loaded 220 to provide information about the database schema of the database that will be accessed by the application. The database metadata may describe the structural component of tables and their elements, but is not so limited.

A comparison of the application metadata and the database metadata 230 may provide the changes that may be made to the existing database schema. These changes would allow the existing database schema to conform to the database schema needed by the application. Comparison of the application metadata and the database metadata 230 may include determining the database schema needed by the application and the existing database schema. The schema for the application and the database may be determined from the metadata of the application and the database, respectively. The comparison may include comparing the database schema needed by the application to the existing database schema.

The database schema can be updated 240 based on the comparison of the application metadata and the database metadata. Updating the database schema may include adding or removing one or more of tables, columns, classes, or class members. Updating the database schema may include changing the relationship between one or more elements or objects in the database.

Figure 3:
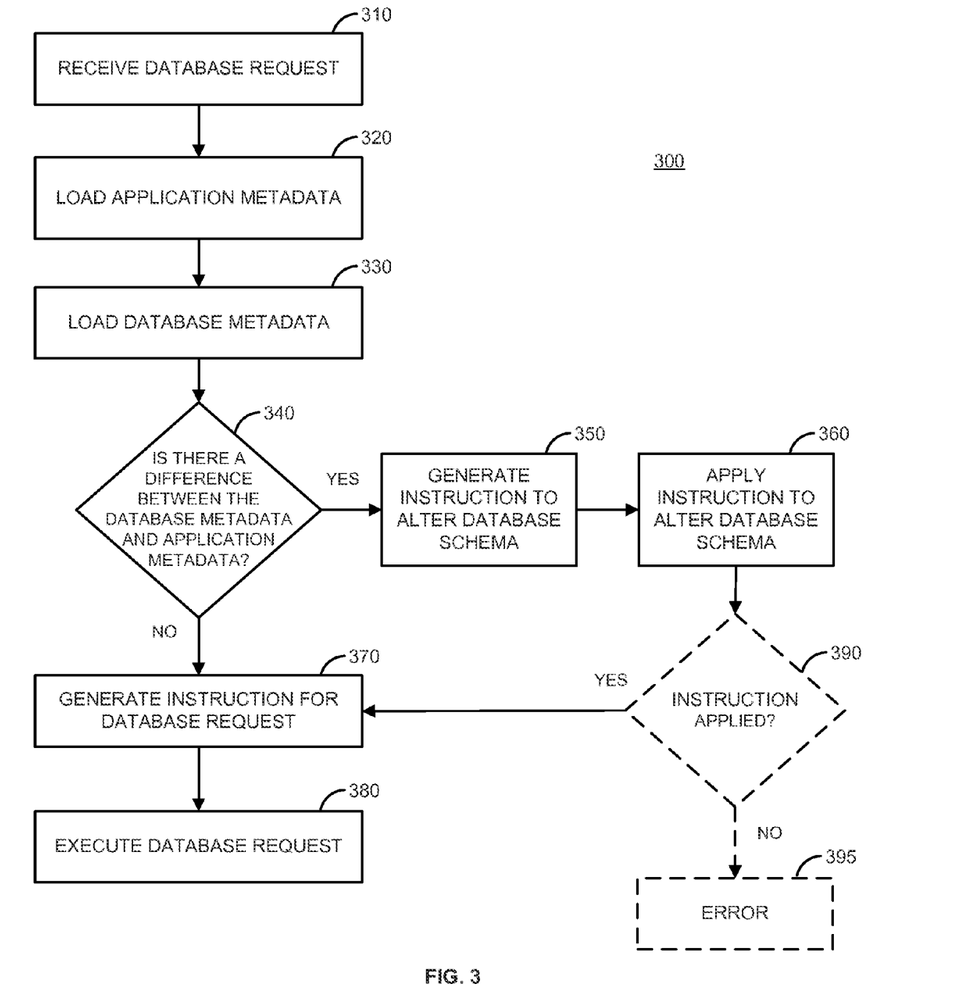
FIG. 3 shows a third embodiment of a process of updating a database schema based on a database request.

FIG. 3 shows a third embodiment of a process 300 of updating a database schema based on a database request. The process may be executed by a processing device. The process may include receiving a database request 310, loading application metadata 320, loading database metadata 330, determining if there is a difference between the application metadata and the database metadata 340, generating instruction to alter database schema 350, applying instruction to alter database schema 360, generating instruction for database request 370, and execute database request 380.

Rather than requiring the application of the SQL script performing batch process to bring the database schema into conformance, the updating of the schema can be driven by normal application database access. The application database access may include receiving a database request from the application 310. Once the request is received, the application metadata can be loaded 320 and the database metadata can be loaded 330 such that a comparison can be made of the metadata 340. Comparison of the application metadata and the database metadata may include comparing the application's database schema and the database schema.

If it is determined that there is a difference between the application metadata and the database metadata (e.g., difference between the schema needed by the application and the current database schema), then instructions can be generated to alter the database schema 350. Generating the instructions to alter the database schema can include generating data definition language (DDL) to alter the schema of the database. The instructions can include instructions to alter the schema of the database such that the schema of the database conforms to the schema needed by the application or the database request of the application. The instructions to alter the database schema can be applied in step 360.

Instruction for the database request can be generated, in step 370, if it is determined that there is no difference between the application metadata and the database metadata in step 340, or after the instructions to alter the database schema are applied in step 360. The instructions may include generating database request using data manipulation language (DML), but is not so limited. Once the instructions for the database request are generated, the database request can be executed in step 380.

The process 300 may include determining whether instruction to alter the database schema was applied 370 and generating an error report 380 if the instructions were not applied. The instructions may not be applied because of environment or network issues (e.g., application server down, loss of connectivity, syntax errors, user does not have permission to make changes).

The process 300 may be repeated for different database requests as the requests are called by the application. Alternatively, the database requests in the application can be processed when the application is not being used to updated the database schema.

Figure 4:
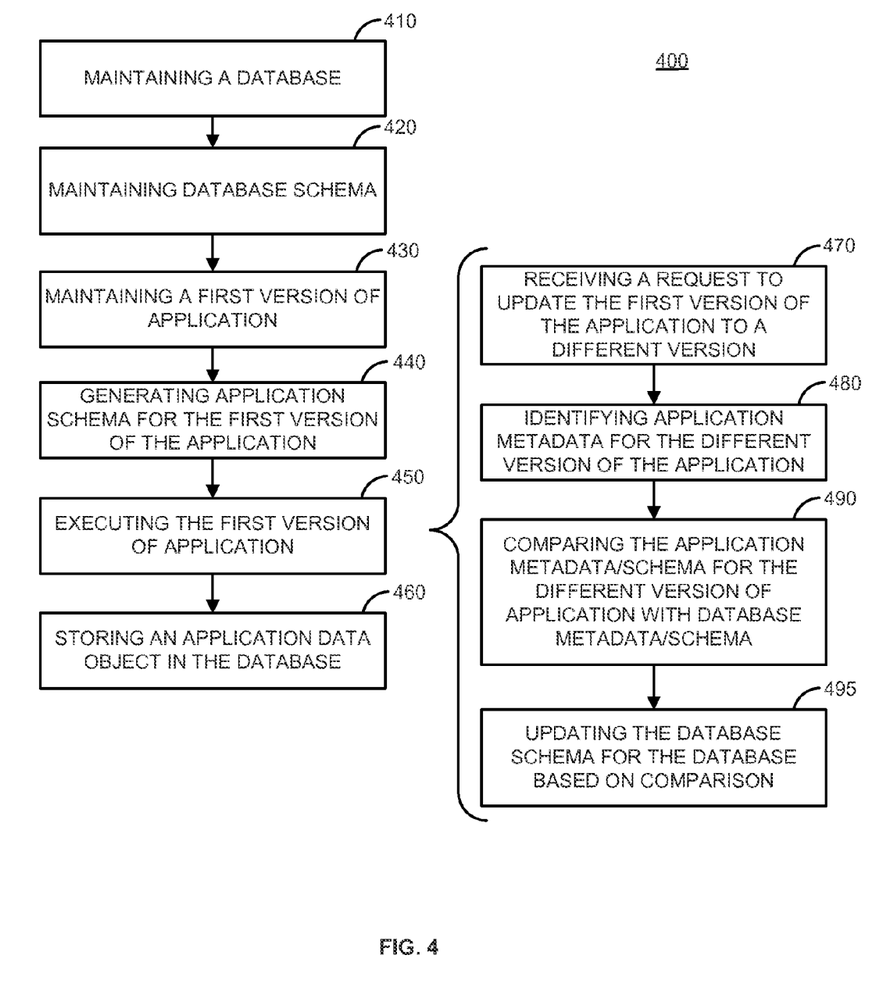
FIG. 4 shows a fourth embodiment of a process of updating a database schema based on a request to update an application.

FIG. 4 illustrates a fourth embodiment of a process 400 of updating a database schema based on a request to update an application. The process 400 may be executed by a processing device. The process 400 may include maintaining a database 410, maintaining database schema 420, maintaining a first version of an application 430, generating application schema for the first version of the application 440, executing the first version of the application 450, and storing an application data object in the database 460. While the first version of the application is executing, the process 400 may include receiving a request to update the first version of the application to a different version 470, identifying application metadata for the different version of the application 480, comparing the application metadata and/or schema for the different version of the application with the database metadata and/or schema 490, and updating the database schema for the database based on the comparison.

Maintaining the database 410 may include maintaining a relational database. The database may include one or more tables. The tables may include one or more columns storing application data objects. Maintaining the database schema for the database 420, may include maintaining database schema describing the one or more tables in the database and columns in the one or more tables.

Maintaining a first version of the application 430 may include maintaining an application that processes requests to access and/or modify data in the database. The first version of the application may have application metadata that includes information about one or more classes of the first version of the application. The application metadata may describe a persistent class of the first version of the application and persistent members of the first version of the application. Maintaining a first version of the application 430 may include maintaining an application schema and/or an application metadata for the first application. The application schema may include a mapping of the one or more classes of the first application to a table in the database. The mapping may be used to identify a location of the respective table in the database.

Generating the application schema for the first version of the application 440 may include generating application schema that includes a mapping of the one or more classes of the first version of the application to a respective table in the database. The application schema may include a mapping of the first application data object to the respective table of the database. The application data object being stored in the respective table of the database. The mapping may identify one or more columns of the respective table where portions of the application data object are stored. The mapping may be included in the application metadata for the first version of the application. The mapping of the one or more classes may be used to identify a location of the respective table in the database.

Executing the first version of the application 450, may be performed in response to a command issued by a user or completion of the application schema being generated for the first version of the application. The execution of the first version of the application may be delayed or an error notification may be issued if the application schema does not include all of the mapping between the one or more classes of the first version of the application and the respective tables in the database.

Storing the application data object in the database 460 may be performed in accordance with the application schema. The application schema may include a mapping between the one or more classes of the first version of the application and the respective table in the database. Storing the application data object in the database 460 may include generating SQL commands in accordance with the application schema and issuing the SQL commands to the database. In another embodiment, storing the application data object in the database 460 may include storing the application data object in the respective table of the database. The application schema may include a mapping of the first application data object to the respective table of the database.

In another embodiment, storing the application data object in the database 460 may include identifying, from the mapping of the one or more classes of the first version of the application to the respective table in the database, a location of the respective table in the database, identifying instructions to store the application data object in the respective table of the database based on the identifying, issuing the instructions to a database management system (DBMS) associated with the database to store the application data object, and updating the database schema to reflect the storing of the application data object. The database management system may include programs to control the creation, organization, maintenance, storage and use of data in the database.

Mapping of the one or more classes of the first application to a respective table in the database, may be used to identify a location of the respective table in the database and the identified location may be used to generate instructions to store a second application data object in the respective table of the database. These instructions may be issued to a database management system associated with the database to store the application data objection of the first application and/or the second data object. The database schema may be updated to reflect the storing of the second application data object.

As shown in FIG. 4, while the first version of the application is executed, the process 400 may receive a request to update the first version of the application to a different version 470. In response to the request, the first version of the application may be updated to the different version of the application. The request to update the application may be issued by the user, by the distributer of the application, or in response to an error notification during execution of the first version of the application (e.g., error notification of the application schema not including all of the mapping between the one or more classes of the first version of the application and the respective tables in the database), but is not so limited.

In response to the request to update the first version of the application, the process may identify application metadata for the different version of the application 480. The application metadata for the different version of the application may be different from the metadata for the first version of the application due to the updates to be made to the first version of the application based on the different version of the application.

To determine what portion, if any, of the database schema should be updated, a comparison may be made between the application metadata and/or schema for the different version of the application and the database metadata and/or schema 490. The comparison may include comparing the application metadata and/or schema with the database metadata and/or schema. The comparison may provide the changes that should be made to the existing database schema to allow the existing database schema to conform to the database schema needed by the different version of the application. Based on the comparison the database schema for the database may be updated 495. Instructions may be generated to update the database schema based on the comparison.

According to one embodiment, the comparison may include determining that a particular table is described in the application metadata and/or schema for the different version of the application but not in the database metadata and/or schema. In such a case, the updating may include generating instructions to add a description of the particular table to the database schema and issuing the instructions to a database management system associated with the database.

According to another embodiment, the comparing may include determining that a particular column is described in the application metadata and/or schema for the different version of the application but not in the database metadata and/or schema. In such a case, the updating may include generating instructions to add a description of the particular column to the database schema and issuing the instructions to a database management system associated with the database.

The steps of maintaining the first version of the application 430, generating application schema for the first version of the application 440, executing the first version of the application 450, and storing an application data object in the database 460, may be performed for the different version of the application. For example, the process 400 may include generating application schema for the different version of the application based on the application metadata for the different version of the application and storing a second application object in the database in accordance with the application schema for the different version of the application.

In one embodiment, the ORM layer can use one or more requests of the application to trigger a comparison of the application schema and the database schema. The ORM may use the application metadata to generate SQL in order to perform the requested operation. The requests to the ORM can be made by the application for objects in the relational database. Instead of making requests directly to the database, applications based on ORM can make requests to the ORM for objects stored in the relational database. The operations that are supported by the ORM may include SELECT, INSERT, UPDATE, and DELETE, but are not so limited. Comparing the details of the request to the database schema can detect differences which may occur as the result of the application upgrade.

In one example, if the application metadata contains a class mapped to database table X and if the database metadata does not contain table X then the class included in the application metadata may be newly added with the current release of the application. The class may be newly added by generating a SQL CREATE TABLE statement from the application metadata which can be applied to the database. After executing the SQL CREATE TABLE statement, the application and database can be synchronized with respect to this class.

In another example, if the database contains a definition of table X but the application does not contain a class mapped to table X, then the class mapped to table X may have been removed in the current release of the application. The class can be removed by generating a SQL DROP TABLE statement for table X which can be applied to the database. After executing the SQL DROP TABLE statement, the application and database can be synchronized with respect to this class.

In another example, if the application metadata contains a table X containing a member Y which is mapped to column Y in the database but the current database metadata contains table X but not column Y then the assumption can be made that column Y was newly added to table X in the new release of the application. To update the schema of the database, an ALTER TABLE statement can be generated to add column Y to table X in the schema of the database. After executing the ALTER TABLE statement, the application and database can be synchronized with respect to this class.

In another example, if the database contains a table X containing column Y but the class of the application mapped to table X does not contain a member mapped to database column Y, then the assumption can be made that the member formerly mapped to column Y was removed in the current release of the application. To update the schema of the database, a SQL ALTER TABLE statement can be generated to drop column Y from table X in the schema of the database. After executing the a SQL ALTER TABLE statement, the application and database can be synchronized with respect to this class. Thus, the application and database are now synchronized with respect to table X which does not contain column Y.

The embodiments of the present disclosure can also be applied to databases that include indexes and/or referential constraints. The metadata of these databases can be compared to the metadata of the application if the application metadata contain elements corresponding to the database elements.

The operations discussed above do not have to be performed at the time the application is updated. The operations can be performed after the application is updated. Further, the operations can be performed in the background, allowing the application to continue executing the application requests. As discussed above, the operations can be performed at the time the application makes a database request. Thus, the database schema can be updated when the application makes a database request that may need the database schema to be updated.

Alternatively, the operations of updating the database schema can be performed when a load on the system running the application is below a predetermined threshold. In one embodiment, some elements of the database schema can be updated when a database request needing the updated database schema is made and the remaining elements of the database schema can be updated when the load on the system is below a predetermined threshold.

The various embodiments of updating the database schema may be applied to a new database when an existing database is replaced by a new database. The database schema of the new database may need to be updated if the database schema does not conform to the database schema needed by the application. Thus, although the application may not change, the above method may be applied to change a new database such that the schema of the new database conforms to the existing application.

Some embodiments of the disclosure may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the disclosure may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the disclosure may be implemented using Java, C++, or other object-oriented programming language and development tools. Another embodiment may be implemented in hard-wired circuitry in place of, or in combination with machine readable software instructions.

Figure 5:
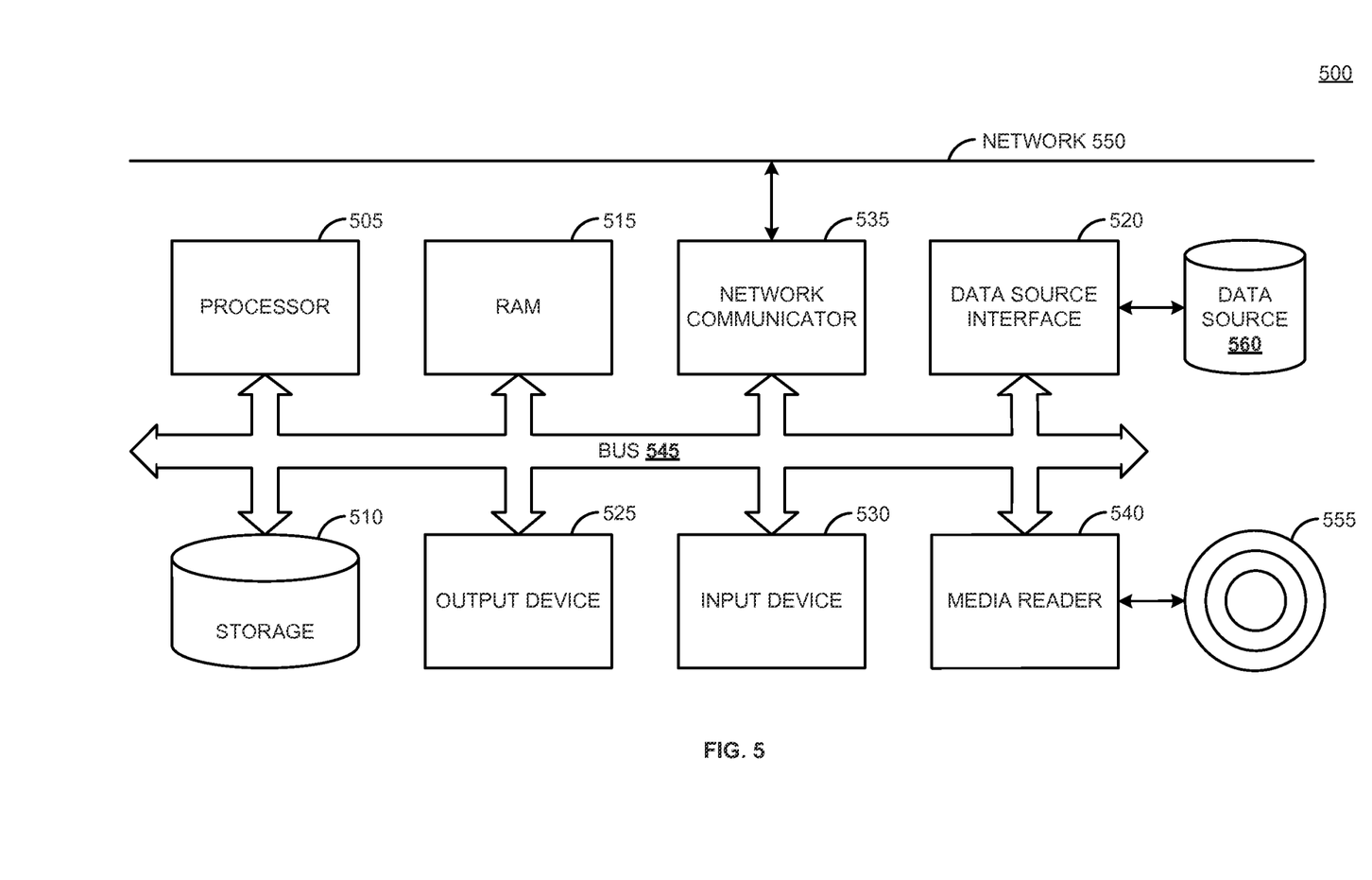
FIG. 5 is a block diagram of an exemplary computer system.

FIG. 5 is a block diagram of an exemplary computer system 500. The computer system 500 includes a processor 505 that executes software instructions or code stored on a computer readable storage medium 555 to perform the above-illustrated methods of the disclosure. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

A semantic layer is an abstraction overlying one or more data sources. It removes the need for a user to master the various subtleties of existing query languages when writing queries. The provided abstraction includes metadata description of the data sources. The metadata can include terms meaningful for a user in place of the logical or physical descriptions used by the data source. For example, common business terms in place of table and column names. These terms can be localized and or domain specific. The layer may include logic associated with the underlying data allowing it to automatically formulate queries for execution against the underlying data sources. The logic includes connection to, structure for, and aspects of the data sources. Some semantic layers can be published, so that it can be shared by many clients and users. Some semantic layers implement security at a granularity corresponding to the underlying data sources' structure or at the semantic layer. The specific forms of semantic layers includes data model objects that describe the underlying data source and define dimensions, attributes and measures with the underlying data. The objects can represent relationships between dimension members, provides calculations associated with the underlying data.

In the above description, numerous specific details are set forth to provide a thorough understanding of embodiments of the present disclosure. One skilled in the relevant art will recognize, however that the embodiments can be practiced without one or more of the specific details or with other methods, components, techniques, etc. In other instances, well-known operations or structures are not shown or described in details to avoid obscuring aspects of the present disclosure.

Although the processes illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present disclosure. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the disclosure to the precise forms disclosed. While specific embodiments of, and examples for, the disclosure are described herein for illustrative purposes, various equivalent modifications are possible within the scope of the disclosure, as those skilled in the relevant art will recognize. These modifications can be made to the embodiments of the disclosure in light of the above detailed description. Rather, the scope of the disclosure is to be determined by the following claims, which are to be interpreted in accordance with established doctrines of claim construction.

I claim:

1. A method, comprising:
 maintaining a database having one or more tables;
 maintaining database schema for the database, the database schema describing the one or more tables in the database and columns in the one or more tables;
 maintaining a first version of an application having application metadata that includes information about one or more classes of the first version of the application;

generating application schema for the first version of the application, the application schema comprising a mapping of the one or more classes of the first version of the application to a respective table in the database;
executing the first version of the application;
storing an application data object in the database in accordance with the application schema; and
while the first version of the application is executing:
receiving a request to update the first version of the application to a different version of the application;
identifying application metadata for the different version of the application;
comparing the application metadata for the different version of the application with the database schema for the database; and
updating the database schema for the database based on the comparison.

2. The method of claim 1, wherein the application metadata describes a persistent class of the first version of the application and persistent members of the first version of the application.

3. The method of claim 1, wherein storing the application data object in the database comprises generating SQL commands in accordance with the application schema and issuing the SQL commands to the database.

4. The method of claim 1, wherein storing the application data object in the database comprises:
identifying, from the mapping of the one or more classes of the first version of the application to the respective table in the database, a location of the respective table in the database;
the database based on the identifying;
issuing the instructions to a database management system associated with the database to store the application data object; and
updating the database schema to reflect the storing of the application data object.

5. The method of claim 1, wherein the application schema includes a mapping of the first application data object to the respective table of the database and wherein the application data object is stored in the respective table of the database.

6. The method of claim 1, wherein the mapping in the application metadata for the first version of the application identifies one or more columns of the respective table where portions of the application data object are stored.

7. The method of claim 1, further comprising updating the first version of the application to the different version of the application.

8. The method of claim 1, further comprising:
generating application schema for the different version of the application based on the application metadata for the different version of the application; and
storing a second application object in the database in accordance with the application schema for the different version of the application.

9. The method of claim 1, wherein the comparing comprises determining that a particular table is described in the application metadata for the different version of the application but not in the database schema, and wherein the updating includes generating instructions to add a description of the particular table to the database schema and issuing the instructions to a database management system associated with the database.

10. The method of claim 1, wherein the comparing comprises determining that a particular column is described in the application metadata for the different version of the application but not in the database schema, and wherein the updating includes generation instructions to add a description of the particular column to the database schema and issuing the instructions to a database management system associated with the database.

11. A non-transitory computer readable storage medium storing one or more programs configured to be executed by a processor, the one or more programs comprising instructions for:
maintaining a database having one or more tables;
maintaining database schema for the database, the database schema describing the one or more tables of the database;
maintaining an application having application metadata that includes information about one or more classes of the application;
generating application schema for the application that includes a mapping of the one or more classes of the application to a table in a database;
executing the application;
storing an application data object in the database in accordance with the application schema; and
while the application is executing:
detecting a request to the database from the application;
identifying application metadata for the application;
comparing, in response to the request from the application, the application metadata with the database schema;
generating instructions to update the database schema based on the comparison; and
updating the database schema with the instructions.

12. The non-transitory computer readable storage medium of claim 11, further comprising:
identifying, from the mapping of the one or more classes of the first application to a respective table in the database, a location of the respective table in the database;
generating instructions to store a second application data object in the respective table of the database based on the identifying;
issuing the instructions to a database management system associated with the database to store the application data object; and
updating the database schema to reflect the storing of the second application data object.

13. The non-transitory computer readable storage medium of claim 11, wherein the application schema further comprises a mapping of the application data object to the table in the database.

14. The non-transitory computer readable storage medium of claim 11, wherein the mapping in the application schema identifies one or more columns of the table where portions of the application data object are stored.

15. The non-transitory computer readable storage medium of claim 11, wherein the comparing comprises determining that a particular table is described in the application schema but not in the database schema, wherein generated instructions add a description of the particular table to the database schema, and wherein the updating includes issuing the instructions to a database management system associated with the database.

16. The non-transitory computer readable storage medium of claim 11, wherein the comparing comprises determining that a particular column is described in the application metadata but not in the database schema, wherein the generated instructions add a description of the particular column to the database schema, and wherein the updating includes issuing the instructions to a database management system associated with the database.

17. A server system, comprising:
one or more processors; and
memory storing one or more programs for execution by the one or more processors, the one or more programs including instructions for:
  maintaining a database having one or more tables;
  maintaining database schema for the database, the database schema describing the one or more tables of the database;
  maintaining an application having application metadata that includes information about one or more classes of the application;
  generating application schema for the application that includes a mapping of the one or more classes of the application to a table in a database;
  executing the application;
storing an application data object in the database in accordance with the application schema; and
  while the application is executing:
    detecting a request to the database from the application;
    identifying application metadata for the application;
    comparing, in response to the request from the application, the application metadata with the database schema;
    generating instructions to update the database schema based on the comparison; and
    updating the database schema with the instructions.

\* \* \* \* \*